United States Patent [19]
Vrisakis et al.

[11] 3,856,723
[45] Dec. 24, 1974

[54] ELASTOMERS REINFORCED WITH SILICEOUS FILLERS

[76] Inventors: George Vrisakis, 4 Quai de la Plage 69, Collonges-Au-Mont D'Or; Jean Machurat, 8 rue Descartes 69, Neuville-Sur-Saone, both of France

[22] Filed: Apr. 28, 1972

[21] Appl. No.: 248,547

[30] Foreign Application Priority Data
  May 6, 1971  France .............................. 71.17263

[52] U.S. Cl.................... 260/4, 106/308 M, 260/5, 260/29.7 WA, 260/42.32, 260/42.33, 260/42.34, 260/42.36, 260/42.37, 260/887
[51] Int. Cl..... C08c 9/14, C08c 11/10, C08c 11/14
[58] Field of Search..... 106/308 M; 260/4, 5, 42.32, 260/42.33, 42.34, 42.36, 42.37, 887, 29.7 WA

[56] References Cited
UNITED STATES PATENTS

| | | | |
|---|---|---|---|
| 3,392,140 | 7/1968 | Maabs et al. | 260/29.7 WA |
| 3,441,525 | 4/1969 | Kern et al. | 260/887 |
| 3,656,981 | 4/1972 | Beschke et al. | 160/288 B |

Primary Examiner—Morris Liebman
Assistant Examiner—H. H. Fletcher
Attorney, Agent, or Firm—Harold H. Flanders; Donald S. Lilly

[57] ABSTRACT

Process for improving the properties of elastomers reinforced with siliceous fillers, consisting of incorporating in the vulcanizable mixture an additive which is a polyvinyl alcohol or a polyvinylacetate and the new composition obtained by application of the process.

2 Claims, No Drawings

ELASTOMERS REINFORCED WITH SILICEOUS FILLERS

The present invention is concerned with new compositions of vulcanizable elastomers reinforced with siliceous fillers, presenting favorable vulcanization conditions and producing vulcanized products with improved properties.

It is known to reinforce vulcanizable elastomer compositions by the addition of siliceous fillers. The advantages derived from such additions are unfortunately frequently offset at high levels of filler by vulcanization difficulties and the vulcanized products obtained often have certain mechanical properties deemed insufficient: the modulus is low; the permanent deformation after compression is too great.

The applicants have found that upon adding polyvinyl alcohol to these elastomer compositions with siliceous fillers under certain conditions, it is possible to at least partially reduce the various defects and disadvantages cited and to improve other properties such as hardness and resistance to tearing.

French Pat. No. 1,529,058 of June 16, 1967, recommended modifying siliceous fillers by means of a reactive organic polymer such as polyvinyl alcohol. Towards this objective, a silicate and a polymer are coprecipitated — which results in a reactive modified silicate whose scope of application is broadened. Polyvinyl alcohol is chemically fixed with the silicate and thus becomes insoluble. It forms an integral part of the filler and does not play a role of its own.

The technique used in the present invention is totally different. It concerns a simple mixture with the elastomer and the polyvinyl alcohol in which each compound plays its own role. There is no chemical modification in the siliceous filler in order to give it a reactive nature, the polyvinyl alcohol remains in a free state maintaining all of its solubility in water.

The purpose of the present invention is thus to add a polyvinyl alcohol or an equivalent compound to a vulcanizable elastomer mixture with siliceous fillers. Adding polyvinyl alcohol makes it possible to obtain a mixture containing a higher level of siliceous fillers and the vulcanized product obtained displays improved properties: permanent deformation upon compression and/or the remaining elongations are less, while the hardness and/or the modulus and/or the resistance to tearing are increased.

An appropriate polyvinyl alcohol may be any polyvinyl alcohol or homologue resulting from the more or less intensified hydrolysis of a polymerized vinyl ester. The polyvinyl acetate resulting from the more or less intensified polymerization of vinyl acetate also gives interesting results.

The percentage of the polyvinyl alcohol or equivalent compound empolyed may vary in fairly large proportions ranging from 0.5 to 20% by weight of the elastomer and from 0.5 to 10% by weight of the siliceous filler.

The percentage by weight of the siliceous filler with respect to the elastomer varies within the usual limits. A percentage by weight ranging between 5 and 250% according to the type of filler and of elastomer covers the essential range with respect to the application of such mixtures.

The invention applies to a wide variety of mixtures of vulcanizable elastomers and siliceous fillers.

The following may be cited as vulcanizable elastomers: natural rubber, butadiene-styrene copolymers, the polybutadienes, butyl rubber, cispolyisoprene, polychloroprene. The invention also applies more particularly to EPDM elastomer polymers, i.e. the ternary polymers of ethylene, propylene, and monomer diene — non-conjugated diene giving a certain unsaturated quality to rubber which permits it to be vulcanized by common combinations. The dienes used generally belong to one of the following groups: non-conjugated linear dienes such as 1,4-hexadiene, 2 methylpentadiene 2-4, etc., monocyclic diolefins such as 1-4 cyclopentadiene, 1-5 cyclooctadiene, etc., bicyclic diolefins such as tetrahydroindene, bicycloheptadiene, etc., polyalkenylcycloalkanes such as divinylcyclobutane, trivinylcyclohexane, derivatives of norbornene, dicyclopentadiene, and the linear dienes such as decatriene, etc.

In general, all the elastomer polymers are suitable for the application of the present invention.

Reinforcing fillers and semi-reinforcing fillers, both natural or synthetic, may be cited as siliceous fillers. The clays and the kaolins, as well as silico-aluminates of varying purity, are quite suitable as natural fillers according to the particular application considered.

Precipitated silicas, thermal silicas, precipitated silicoaluminates, and precipitated calcium silicates may be cited as synthetic fillers.

The introduction of polyvinyl alcohol or of its homologues to the mixture of vulcanizable elastomer and siliceous fillers may take place in several ways:

— The direct addition of polyvinyl alcohol upon the preparation of the elastomer mixture and fillers with the various classical additives of a rubber mixture.

— Polyvinyl alcohol may be first added to a solubilizing or swelling product such as diethylene glycol, glycerin, water, or it may be placed in emulsion and the resultant dispersion or solution added to the rubber mixture.

— Polyvinyl alcohol in aqueous solution may be previously mixed with the siliceous filler in aqueous suspension. After malaxation, the mixture is dried and crushed if necessary. The filler which has simply been impregnated with polyvinyl alcohol but which has not been chemically modified by the alcohol is then added to the rubber mixture.

— The polyvinyl alcohol can be added previously to the elastomer either while manufacturing the latter, or by appropriately treating the finished product.

In addition to the components already mentioned, all the commonly used products may be added to the mixture, such as oil, pigments, inert fillers, antioxidants, antiburn agents, zinc oxide, vulcanizing agents, and vulcanization accelerators, etc.

These compositions may be prepared with the aid of any of the usual equipment used in the rubber industry, such as internal mixers, open malaxators, etc.

The use of polyvinyl alcohol or homologues generally results in vulcanized products having an increase in the moduli, an improvement in the permanent deformation after compression, and an improvement in the remaining elongations.

According to the type of polymer, the nature of the filler, and the method of application, other properties may be improved. Thus with EPDM rubber, the resistance to tearing of the vulcanized products is improved by working with heat. Polychloroprene improves the vulcanization speed of the mixture and the resistance to tearing of the vulcanized product. With butyl rubber, the state of the surface of the vulcanized product is improved.

In general, any usage of a reinforcing filler is followed by a parallel increase in the viscosity of the mixture. With the addition of polyvinyl alcohol, it is observed that the viscosity may diminish without having a negative effect on the properties other than those improved as described above. Even when the viscosity does not diminish, the sum total of the properties is improved.

It may thus be said that polyvinyl alcohol or its homologues make it possible to better profit from the reinforcing siliceous elements in the elastomers.

We will now present examples illustrating the invention.

Various polyvinyl alcohols were used, defined by two means. The first indicates the viscosity of an aqueous solution at 4% by weight at 20° C and measures the degree of condensation; the second corresponds to the ester index or rate of hydrolysis.

The different mixtures used in these examples were prepared with a Banbury according to the reverse method and were then finished in an open malaxator according to a so-called cold operating method No. 1, with a maximum final temperature of 120°C, or according to a so-called hot operating method No. 2, with a final temperature ranging from 155° to 170°C.

The two operating methods are described in detail below:

OPERATING METHOD NO. 1 "COLD"

| Banbury | Time: | Temperature: |
|---|---|---|
| Speed 80 rpm. Open cooling. The different ingredients of the mixture are added: Fillers, oil, zinc oxide Stearic acid, Polyethylene glycol 4000 Polyvinyl alcohol Accelerators Elastomer | | 30 – 35° C |
| Overall time involved in adding the ingredients and mixing. A temperature is reached of: | 3 min. 30 sec. | 105 – 120° C |
| Open malaxator | | |

After formation of the sleeve and the addition of sulfur, malaxation is carried out for 2 minutes. Rolling is carried out 4 times at the end and a sheet 3 mm in thickness is drawn out. Note: Rest time of the mixtures: 15 hours (minimum).

OPERATING METHOD NO. 2 "HOT"

| Banbury | Time: | Temperature: |
|---|---|---|
| Preheating of the Banbury Speed 80 rpm, without cooling. The different ingredients of the mixture are added: Fillers, oil, zinc oxide, Stearic acid, polyethylene glycol 4000 Polyvinyl alcohol Elastomer | | 60 – 70° C |
| Overall time involved in adding and mixing | 2 min. 30 sec. | |
| Malaxation is then carried out for one minute at a speed of 120 rpm. The temperature climbs to: | | 150° C |
| The accelerators are added at the speed of 80 rpm and malaxation is carried out for 1 minute 30 seconds. A temperature is reached of: | | 155 – 170° C |
| Open malaxator | | |

After formation of the sleeve and after adding sulfur, malaxation is carried out for 2 minutes. Rolling is carried out 4 times at the end and a sheet 3 mm in thickness is drawn out. Note: Rest time of the mixtures: 15 hours (minimum).

VULCANIZATION STAGE

1. Material
   a. Hydraulic heating steam press
   b. Molds
   According to ASTM Standard D 15-58 T Part B
2. Conditions
   As indicated in the different examples.
   Rest time of the vulcanized products — 15 hours minimum.

EXAMPLE 1

By way of comparison, we will use as a siliceous filler a precipitated silica in a first case that is not impregnated and in a second case one that is impregnated with 4% by weight of polyvinyl alcohol (4/125).

The following mixture is obtained by weight:

| | |
|---|---|
| Butyl rubber 365 | 100 |
| Precipitated silica | 60 |
| Zinc oxide | 4 |
| Stearic acid | 2 |
| Polyethylene glycol 4000 | 3 |
| Paraffin oil | 10 |
| Tetramethylthiuram disulfide | 1.5 |
| Mercaptobenzothiazole | 1 |
| Sulfur | 2 |
| Tellurium diethyldithiocarbamate | 1 |

This mixture was obtained according to the so-called cold operating method.

The following table gives the results obtained.

It shows that the presence of polyvinyl alcohol produces a drop in the minimal couple indicative of the viscosity, without a noticeable modification of the properties. Furthermore, the surface appearance of the vulcanized products is excellent.

It shows that the presence of polyvinyl alcohol reduces the vulcanization time, causes a significant increase in the modulus, and augments the resistance to

| Polyvinyl alcohol (Rhodoviol 4/125 Trademark filed) in weight with respect to silica | 0% | | | 4% | | |
|---|---|---|---|---|---|---|
| Monsanto Rheometer at 150° C. | | | | | | |
| Minimal couple (Cm) | 29.0 | | | 18.0 | | |
| Maximal couple (CM) | 80.0 | | | 80.0 | | |
| (CM - Cm) | 51.0 | | | 62.0 | | |
| Vulcanization at 150° C (minutes) | 10 | 15 | 20 | 10 | 15 | 20 |
| Rupture resistance kg/sq cm | 116 | 120 | 120 | 100 | 100 | 98 |
| Shore Hardness A | 65 | 68 | 68 | 66 | 67 | 69 |
| Model at 100% elongation | 15 | 18 | 18 | 20 | 24 | 25 |
| Model at 200% elongation | 23 | 25 | 25 | 26 | 30 | 34 |
| Model at 300% elongation | 33 | 36 | 37 | 37 | 39 | 43 |
| Elongation % | 675 | 660 | 645 | 620 | 620 | 575 |
| Tearing kg/cm | | | | | | |
| . Angular | 33 | 35 | 32 | 32 | 34 | 31 |
| Remaining elongation % | 80 | 75 | 75 | 75 | 70 | 70 |
| Permanent deformation after compression expressed in: | | | | | | |
| . % of H (1) | — | 15.45 | 15.1 | — | 14.5 | 13.0 |
| . % of the deflection (2) | — | 60.2 | 58.6 | — | 57.2 | 51.2 |

(1) H = Height of the test piece at the beginning
(2) at 25% deflection

EXAMPLE 2

By way of comparison, we will use as a siliceous filler a precipitated silica, non-impregnated in a first case and impregnated in a second case with 4% 4/125 polyvinyl alcohol.

The following mixture is obtained by weight:

| | |
|---|---|
| Butaclor MC 30 polychloroprene rubber | 100 |
| Precipitated silica | 50 |
| Aromatic oil | 10 |
| Stearic acid | 1 |
| Elastomag 170 calcinated magnesium oxide | 4 |
| Polyethylene glycol 4000 | 2.5 |
| Zinc oxide | 5 |
| Sulfur | 0.5 |
| 2 mercaptoimidazoline | 0.5 |

The mixture was obtained according to the so-called cold method.

The following table gives the results obtained.

rupture. Furthermore, the surface state of the vulcanized products is greatly improved.

| Polyvinyl alcohol (Rhodoviol 4/125 Trademark filed) in weight with respect to silica | 0% | | | 4% | | |
|---|---|---|---|---|---|---|
| Monsanto Rheometer at 150° C | | | | | | |
| Minimal couple (Cm) | 14.0 | | | 12.5 | | |
| Maximal couple (CM) | 87.0 | | | 73.0 | | |
| (CM - Cm) | 73.0 | | | 60.5 | | |
| Vulcanization at 150° C (minutes) | 20 | 25 | 30 | 20 | 25 | 30 |
| Rupture resistance kg/sq cm | — | 165 | 161 | 185 | 186 | 182 |
| Shore Hardness A | — | 76 | 76 | 73 | 73 | 72 |
| Model at 100% elongation | — | 22 | 24 | 26 | 28 | 29 |
| Model at 200% elongation | — | 36 | 35 | 46 | 49 | 51 |
| Model at 300% elongation | — | 53 | 50 | 68 | 71 | 76 |
| Elongation % | — | 710 | 730 | 680 | 640 | 600 |
| Tearing kg/cm | | | | | | |
| . Angular | — | 52 | 52 | 61 | 60 | 54 |
| Remaining elongation % | — | 85 | 70 | 85 | 75 | 60 |
| Permanent deformation after compression expressed in: | | | | | | |
| . % of H (1) | — | — | 12.2 | — | — | 10.7 |
| . % of the deflection (2) | — | — | 49.40 | — | — | 40.9 |

(1) H = Height of the test piece at the beginning
(2) at 25% deflection

EXAMPLE 3

By way of comparison, we will use as a siliceous filler a precipitated silica, non-impregnated in a first case and impregnated in a second case with 4% 4/125 polyvinyl alcohol.

The mixture is obtained as follows according to weight:

| | |
|---|---|
| POLYSAR 1509 Styrene-butadiene rubber | 100 |
| Precipitated silica | 58.5 |
| Polyethylene glycol 4000 | 3 |
| Stearic acid | 3 |
| Zinc oxide | 3 |
| Mercaptobenzothiazole disulfide | 1.5 |
| Diorthotolylguanidine | 2.25 |
| Sulfur | 2.25 |

This mixture is obtained according to the so-called cold operating method.

The following table gives the results obtained. It shows the presence of polyvinyl alcohol causes a more or less noticeable increase in the modulus according to the vulcanization time and a clear increase in the hardness.

EXAMPLE 4

Mixtures were obtained according to the formulae shown in the table below:

| Reference Mixture | 1 | 2 | 3 | 4 |
|---|---|---|---|---|
| Natural rubber | 100 | 100 | 50 | 50 |
| Cariflex polybutadiene rubber | — | — | 50 | 50 |
| Zinc oxide | 4.00 | 4.00 | 4.00 | 4.00 |
| Stearic acid | 3.00 | 3.00 | 3.00 | 3.00 |
| Polyethylene glycol 4000 | 2.50 | 2.50 | 2.50 | 2.50 |
| Polyvinyl alcohol (Rhodoviol 25/140) | — | 2.20 | — | 2.20 |
| Mercaptobenzothiazole disulfide | 0.50 | 0.50 | 0.50 | 0.50 |
| Diorthotolylguanidine | 1.00 | 1.00 | 1.00 | 1.00 |
| Tetramethylthiuram monosulfide | 0.25 | 0.25 | 0.25 | 0.25 |
| Zeosil 45 precipitated silica | 55.0 | 55.0 | 55.0 | 55.0 |
| Clear naphthenic oil | 10.0 | 10.0 | 10.0 | 10.0 |
| Sulfur | 2.30 | 2.30 | 2.30 | 2.30 |

These mixtures were obtained according to the so-called hot operating method.

The following tables give the results obtained.

| Polyvinyl alcohol (Rhodoviol 4/125 Trademark filed) in weight with respect to silica | 0% | | | 4% | | |
|---|---|---|---|---|---|---|
| Monsanto Rheometer at 150° C | | | | | | |
| Minimal couple (Cm) | 19 | | | 19 | | |
| Maximal couple (CM) | 95 | | | 95 | | |
| (CM - Cm) | 76 | | | 76 | | |
| Vulcanization at 150° C (minutes) | 10 | 15 | 20 | 10 | 15 | 20 |
| Rupture resistance kg/sq cm | 190 | 190 | 175 | 195 | 180 | 180 |
| Shore Hardness A | 72 | 73 | 74 | 78 | 77 | 78 |
| Model at 100% elongation | 21 | 20 | 18 | 20 | 25 | 21 |
| Model at 200% elongation | 31 | 25 | 22 | 30 | 40 | 34 |
| Model at 300% elongation | 46 | 40 | 40 | 50 | 57 | 51 |
| Elongation % | 700 | 680 | 630 | 660 | 600 | 585 |
| Tearing kg/cm | | | | | | |
| . Angular | 38 | 39 | 39.5 | 44 | 43 | 43 |
| Remaining elongation % | 65 | 60 | 60 | 65 | 60 | 60 |
| Permanent deformation after compression expressed in: | | | | | | |
| . % of H (1) | — | 12.25 | 10.65 | — | 12.10 | 10.60 |
| . % of the deflection (2) | — | 47.5 | 40.80 | — | 47.20 | 40.90 |

(1) H = Height of the test piece at the beginning
(2) at 25% deflection

| Reference of the mixtures | 1 | | | 2 | | |
|---|---|---|---|---|---|---|
| Monsanto Rheometer at 150° C | | | | | | |
| Minimal couple (Cm) | 6.5 | | | 7 | | |
| Maximal couple (CM) | 68.0 | | | 69 | | |
| (CM - Cm) | 61.5 | | | 62 | | |
| Vulcanization at 150° C (minutes) | 5 | 8 | 10 | 5 | 8 | 10 |
| Rupture resistance kg/sq cm | 212 | 202 | 170 | 192 | 175 | 168 |
| Shore Hardness A | 57 | 56 | 54 | 63 | 64 | 65 |
| Model at 100% elongation | — | — | — | 2 | 2 | — |
| Model at 200% elongation | 4.0 | 3.0 | 3.0 | 20.0 | 14.0 | 12.0 |
| Model at 300% elongation | 19.0 | 18.0 | 15.0 | 41.0 | 29.0 | 27.0 |
| Elongation % | 730 | 725 | 715 | 620 | 640 | 670 |
| Tearing kg/cm | | | | | | |
| . Angular | 77.0 | 59.0 | 51.0 | 70 | 66 | 57 |
| Remaining elongation % | 97 | 95 | 90 | 92 | 92 | 95 |
| Permanent deformation after compression expressed in: | | | | | | |
| . % of H (1) | — | 16.0 | — | — | 12.8 | — |
| . % of the deflection (2) | — | 62.7 | — | — | 50.5 | — |

(1) H = Height of the test piece at the beginning
(2) at 25% deflection

This table shows that the addition of polyvinyl alcohol leads to a very large increase in the hardness and the modulus and a permanent deformation after lowered compression despite the elevation of the hardness.

These mixtures were obtained according to the so-called hot method.

The following table gives the results obtained. It shows that the addition of polyvinyl alcohol causes an

| Reference of the mixtures | 3 | | | 4 | | |
|---|---|---|---|---|---|---|
| Monsanto Rheometer at 150° C | | | | | | |
| Minimal couple (Cm) | 27 | | | 26 | | |
| Maximal couple (CM) | 102 | | | 90 | | |
| (CM - Cm) | 75 | | | 64 | | |
| Vulcanization at 150° C (minutes) | 8 | 10 | 15 | 8 | 10 | 15 |
| Rupture resistance kg/sq cm | 184 | 166 | 160 | 155 | 154 | 157 |
| Shore Hardness A | 65 | 65 | 65 | 67 | 66 | 65 |
| Model at 100% elongation | 2.0 | 2.0 | 2.0 | 6.0 | 6.0 | 11.0 |
| Model at 200% elongation | 12.0 | 13.0 | 13.0 | 20.0 | 23.0 | 29.0 |
| Model at 300% elongation | 25.0 | 26.0 | 25.0 | 37.5 | 37.0 | 48.0 |
| Elongation % | 740 | 700 | 705 | 675 | 660 | 635 |
| Tearing kg/cm | | | | | | |
| . Angular | 51.0 | 53.5 | 51.0 | 76.0 | 80.0 | 68.5 |
| Remaining elongation % | 87.0 | 80.0 | 80.0 | 85.0 | 80.0 | 80.0 |
| Permanent deformation after compression expressed in: | | | | | | |
| . % of H (1) | — | 11.0 | 9.7 | — | 13.1 | 11.5 |
| . % of the deflection (2) | — | 42.3 | 38.1 | — | 50.7 | 44.95 |

(1) H = Height of the test piece at the beginning
(2) at 25% deflection

This table shows that the addition of polyvinyl alcohol causes a noticeable increase in the modulus and in the resistance to tearing.

increase in the modulus and a decrease in the minimum couple indicative of the viscosity.

| Reference of the mixtures | 1 | | | 2 | | |
|---|---|---|---|---|---|---|
| Monsanto Rheometer at 150° C | | | | | | |
| Minimal couple (Cm) | 34.0 | | | 29.0 | | |
| Maximal couple (CM) | 96.0 | | | 91.0 | | |
| (CM - Cm) | 62.0 | | | 62.0 | | |
| Vulcanization at 150° C (minutes) | 10 | 15 | 20 | 10 | 15 | 20 |
| Rupture resistance kg/sq cm | 201 | 221 | 221 | 210 | 219 | 217 |
| Shore Hardness A | 74 | 75 | 74 | 73 | 74 | 74 |
| Model at 100% elongation | 28 | 30 | 31 | 28 | 32 | 33 |
| Model at 200% elongation | 56 | 58 | 60 | 62 | 68 | 66 |
| Model at 300% elongation | 83 | 90 | 91 | 112 | 121 | 119 |
| Elongation % | 585 | 575 | 575 | 505 | 505 | 485 |
| Tearing kg/cm | | | | | | |
| . Angular | 57.0 | 58.0 | 56.0 | 50.0 | 52.0 | 50.0 |
| Remaining elongation % | 85.0 | 82.0 | 82.0 | 80.0 | 76.0 | 76.0 |
| Permanent deformation after compression expressed in: | | | | | | |
| . % of H (1) | 12.5 | 9.65 | — | 10.8 | 8.45 | — |
| . % of the deflection (2) | 47.4 | 37.35 | — | 41.2 | 32.50 | — |

(1) H = Height of the test piece at the beginning
(2) at 25 % deflection

EXAMPLE 5

The mixtures were obtained according to the formulae shown in the table below:

| Reference Mixture | 1 | 2 |
|---|---|---|
| Nitrile Butacril rubber | 100.00 | 100.00 |
| Zinc oxide | 4.00 | 4.00 |
| Stearic acid | 1.00 | 1.00 |
| Polyethylene glycol 4000 | 2.50 | 2.50 |
| Polyvinyl alcohol (Rhodoviol 25/140) | — | 2.00 |
| Zeosil 45 precipitated silica | 50.00 | 50.00 |
| Dioctylphthalate | 5.00 | 5.00 |
| Mercaptobenzothiazole disulfide | 0.80 | 0.80 |
| Tetramethylthiuram monosulfide | 0.40 | 0.40 |
| Sulfur | 1.50 | 1.50 |

EXAMPLE 6

By way of comparison, we will use as a siliceous filler a precipitated silica which is non-impregnated in the first case and impregnated in the second case with 2% by weight of different polyvinyl alcohols and polyvinyl acetate.

The following mixture is obtained in all cases according to weight:

| EPDM rubber - Keltan 514 PO3 | 100 |
|---|---|
| Precipitated silica | 80 |
| Clear naphthenic oil | 40 |
| Stearic acid | 2 |
| Zinc oxide | 5 |
| Polyethylene glycol 4000 | 4 |
| Rhodeptax 2 (brand filed by Rhone Poulenc) | 3.5 |
| Tetramethylthiuram disulfide | 0.5 |
| Sulfur | 2.5 |

The mixture was obtained according to the so-called hot operating method.

The following tables give the results obtained.

| Reference of the mixtures | 1 | | | 2 | | |
|---|---|---|---|---|---|---|
| Polyvinyl alcohol (Rhodoviol 5/270 brand filed) by weight with respect to silica | 0.00% | | | 2.00% | | |
| Monsanto Rheometer at 150° C | | | | | | |
| Minimal couple (Cm) | 38 | | | 31 | | |
| Maximal couple (CM) | 88.5 | | | 92.5 | | |
| Couple (CM - Cm) | 50.5 | | | 61.5 | | |
| Vulcanization at 150° C (minutes) | 10 | 15 | 20 | 10 | 15 | 20 |
| Rupture resistance kg/sq cm | 130 | 128 | 131 | 132 | 130 | 131 |
| Shore Hardness A | 73 | 73 | 74 | 75 | 75 | 75 |
| Model at 100% elongation | 29.0 | 27.0 | 27.0 | 33.0 | 33.0 | 34.0 |
| Model at 200% elongation | 50.0 | 47.0 | 48.0 | 56.0 | 53.0 | 51.0 |
| Model at 300% elongation | 69.0 | 69.0 | 70.0 | 71.0 | 74.0 | 73.0 |
| Elongation % | 545 | 550 | 550 | 520 | 520 | 520 |
| Tearing kg/cm | | | | | | |
| . Angular | 41.0 | 41.0 | 41.0 | 41.0 | 40.0 | 40.0 |
| Remaining elongation % | 55.0 | 53.0 | 51.0 | 48.0 | 50.0 | 48.0 |
| Permanent deformation after compression expressed in: | | | | | | |
| . % of H (1) | 15.5 | 13.8 | 12.6 | 14.5 | 12.3 | 11.2 |
| . % of the deflection (2) | 61.1 | 55.6 | 49.7 | 57.2 | 49.5 | 45.2 |

(1) H = Height of the test piece at the beginning
(2) 25% deflection

The addition of polyvinyl alcohol causes an increase in the hardness and a decrease in the minimal couple, indicative of the viscosity, this decrease not affecting the other properties.

The addition of polyvinyl alcohol causes an increase in the modulus and the hardness, an improvement in the remaining elongation, and a very clear drop in the minimal couple indicative of the viscosity, this drop not affecting the other properties.

| Reference of the mixtures | 3 | | | 4 | | |
|---|---|---|---|---|---|---|
| Polyvinyl alcohol | | | | | | |
| (Rhodoviol 4/20 - brand filed) | 2.00% | | | 0.00% | | |
| (Rhodoviol 50/125 - brand filed) | 0.00% | | | 2.00% | | |
| by weight with respect to silica | | | | | | |
| Monsanto Rheometer at 150° C | | | | | | |
| Minimal couple (Cm) | 32.5 | | | 24.5 | | |
| Maximal couple (CM) | 92.0 | | | 82.5 | | |
| (CM - Cm) | 59.5 | | | 58.0 | | |
| Vulcanization at 150° C (minutes) | 10 | 15 | 20 | 10 | 15 | 20 |
| Rupture resistance kg/sq cm | 125 | 132 | 135 | 120 | 123 | 123 |
| Shore Hardness A | 73 | 74 | 74 | 75 | 76 | 75 |
| Model at 100% elongation | 30 | 33 | 33 | 37 | 38 | 38 |
| Model at 200% elongation | 54 | 55 | 55 | 61 | 61 | 62 |
| Model at 300% elongation | 79 | 81 | 84 | 84 | 85 | 85 |
| Elongation % | 490 | 495 | 480 | 530 | 520 | 520 |
| Tearing kg/cm | | | | | | |
| . Angular | 38 | 39 | 36 | 41 | 42 | 41 |
| Remaining elongation % | 42 | 40 | 40 | 45.0 | 44.0 | 40.0 |
| Permanent deformation after compression expressed in: | | | | | | |
| . % of H (1) | 13.1 | 10.8 | 10.4 | 13.2 | 10.6 | 10.1 |
| . % of the deflection (2) | 52.6 | 32.2 | 42.1 | 53.2 | 43.1 | 40.50 |

(1) H = Height of the test piece at the beginning
(2) at 25% deflection

| Reference of the mixtures | 5 | | | 6 | | |
|---|---|---|---|---|---|---|
| Polyvinyl acetate | | | | | | |
| (Rhodopas A 10 brand filed) | 2.00% | | | 0.00% | | |
| (Rhodopas A M 041 brand filed) | 0.00% | | | 2.00% | | |
| by weight with respect to silica | | | | | | |
| Monsanto Rheometer at 150° C | | | | | | |
| Minimal couple (Cm) | 28 | | | 28 | | |
| Maximal couple (CM) | 87 | | | 94 | | |
| (CM - Cm) | 59 | | | 66 | | |
| Vulcanization at 150° C (minutes) | 10 | 15 | 20 | 10 | 15 | 20 |
| Rupture resistance kg/sq cm | 136 | 132 | 135 | 138 | 136 | 139 |
| Shore Hardness A | 73 | 73 | 74 | 74 | 74 | 74 |
| Model at 100% Elongation | 33.0 | 34.0 | 36.0 | 30.0 | 32.0 | 32.0 |
| Model at 200% Elongation | 56.0 | 57.0 | 57.0 | 54.0 | 52.0 | 52.0 |
| Model at 300% Elongation | 77.0 | 77.0 | 78.0 | 74.0 | 75.0 | 75.0 |
| Elongation % | 520 | 510 | 500 | 500 | 490 | 490 |
| Tearing kg/cm | | | | | | |
| . Angular | 38.0 | 38.0 | 39.0 | 36.0 | 38.0 | 34.5 |
| Remaining Elongation % | 50.0 | 48.0 | 48.0 | 47.0 | 46.0 | 40.0 |
| Permanent deformation after compression expressed in: | | | | | | |
| . % of H (1) | 15.0 | 13.0 | 11.9 | 14.2 | 12.1 | 10.5 |
| . % of the deflection (2) | 60.5 | 53.0 | 48.0 | 57.3 | 48.6 | 42.8 |

(1) H = Height of the test piece at the beginning
(2) at 25% deflection

The presence of polyvinyl alcohol causes an increase in the modulus, a decrease in the minimal couple indicative of the viscosity, without the other properties being affected.

EXAMPLE 7

In this example we will show the influence of an increasing concentration of polyvinyl alcohol. We will use a non-impregnated silica in a first case, and then an impregnated silica in the other cases with an increasing percentage by weight of polyvinyl alcohol.

For this the following mixture is obtained in all cases by weight:

| | |
|---|---|
| EPDM rubber - Keltan 514 PO₃ | 100 |
| Precipitated silica | 80 |
| Clear naphthenic oil | 40 |
| Stearic acid | 2 |
| Zinc oxide | 5 |
| Polyethylene glycol 4000 | 4 |
| Rhodeptax 2 (brand filed Rhone Poulenc) | 3.5 |
| Tetramethylthiuram disulfide | 0.5 |
| Sulfur | 2.5 |

The mixture was obtained according to the so-called hot operating method.

The following tables give the results obtained. They show that there is an optimum with mixture 4. All cases show an improvement in the modulus, in the hardness, and in the permanent deformation upon compression, as well as in the remaining elongation.

| Reference of the mixtures | | 1 | | | 2 | |
|---|---|---|---|---|---|---|
| Polyvinyl alcohol (Rhodoviol 4/125 brand filed) by weight with respect to silica | | 0% | | | 0.50% | |
| Monsanto Rheometer at 150° C | | | | | | |
| Minimal couple (Cm) | | 22.0 | | | 21.0 | |
| Maximal couple (CM) | | 86.0 | | | 87.5 | |
| (CM -Cm) | | 64.0 | | | 66.5 | |
| Vulcanization at 150° C (minutes) | 10 | 15 | 20 | 10 | 15 | 20 |
| Rupture resistance kg/sq cm | 142 | 145 | 148 | 138 | 143 | 145 |
| Shore Hardness A | 72 | 72 | 75 | 74 | 76 | 76 |
| Model at 100% elongation | 20.0 | 20.0 | 21.0 | 24.0 | 26.0 | 28.0 |
| Model at 200% elongation | 28.0 | 30.0 | 35.0 | 33.0 | 36.0 | 42.0 |
| Model at 300% elongation | 42.0 | 42.0 | 46.0 | 46.0 | 47.0 | 54.0 |
| Elongation % | 660 | 640 | 600 | 620 | 610 | 570 |
| Tearing kg/cm | | | | | | |
| . Angular | 39.0 | 39.5 | 39.0 | 40.5 | 41.0 | 41.0 |
| Remaining elongation % | 85 | 75 | 70 | 72 | 70 | 66 |
| Permanent deformation after compression expressed in: | | | | | | |
| . % of H (1) | 15.3 | 12.6 | 9.95 | 14.9 | 11.8 | 9.4 |
| . % of the deflection (2) | 61.4 | 50.60 | 39.90 | 59.8 | 48.6 | 38.10 |

(1) H = Height of the test piece at the beginning
(2) at 25% deflection

| Reference of the mixtures | | 3 | | | 4 | | | 5 | |
|---|---|---|---|---|---|---|---|---|---|
| Polyvinyl alcohol (Rhodoviol 4/125 brand filed) by weight with respect to silica | | 4% | | | 10% | | | 20% | |
| Monsanto Rheometer at 150°C | | | | | | | | | |
| Minimal couple (Cm) | | 21.0 | | | 19.0 | | | 13.5 | |
| Maximal couple (CM) | | 98.0 | | | 107.5 | | | 101.5 | |
| (CM - Cm) | | 77.0 | | | 88.5 | | | 88.0 | |
| Vulcanization at 150°C (Minutes) | 10 | 15 | 20 | 10 | 15 | 20 | 10 | 15 | 20 |
| Rupture resistance kg/sq/cm | 136 | 140 | 129 | 132 | 130 | 130 | 72 | 70 | 74 |
| Shore Hardness A | 72 | 74 | 76 | 77 | 79 | 82 | 74 | 77 | 77 |
| Model at 100% elongation | 37.0 | 42.0 | 44.0 | 44.0 | 48.0 | 52.0 | 40.0 | 41.0 | 47.0 |
| Model at 200% elongation | 57.0 | 64.0 | 64.0 | 75.0 | 82.0 | 85.0 | 52.0 | 55.0 | 61.0 |
| Model at 300% elongation | 72.0 | 84.0 | 90.0 | 95.0 | 105.0 | 103.0 | 64.0 | 70.0 | 66.0 |
| Elongation % | 570 | 530 | 520 | 520 | 490 | 475 | 530 | 490 | 490 |
| Tearing kg/cm | | | | | | | | | |
| . Angular | 41.0 | 39.5 | 38.5 | 38.0 | 36.0 | 36.0 | 32.0 | 32.0 | 32.0 |
| Remaining elongation % | 64.0 | 52.0 | 46.0 | 52.0 | 44.0 | 38.0 | 40.0 | 34.0 | 25.0 |
| Permanent deformation after compression expressed in: | | | | | | | | | |
| . % of H (1) | 11.7 | 9.15 | 7.8 | 9.9 | 7.7 | 6.6 | 9.3 | 6.9 | 5.6 |
| . % of the deflection (2) | 46.8 | 36.8 | 31.9 | 40.1 | 31.3 | 26.8 | 37.6 | 28.1 | 22.4 |

(1) H = Height of the test piece at the beginning
(2) at 25% deflection

EXAMPLE 8

Mixtures were obtained according to the formulae shown in the table below:

| Reference of the mixtures | 1 | | | 2 | | |
|---|---|---|---|---|---|---|
| Monsanto Rheometer at 150° C | | | | | | |
| Minimal Couple (Cm) | 8.0 | | | 7.0 | | |
| Maximal Couple (CM) | 85.0 | | | 89.0 | | |
| (CM - Cm) | 77.0 | | | 82.0 | | |
| Vulcanization at 150° C (minutes) | 10 | 15 | 20 | 10 | 15 | 20 |
| Rupture resistance kg/sq cm | 124 | 115 | 105 | 110 | 106 | 100 |
| Shore Hardness A | 60 | 64 | 64 | 65 | 67 | 68 |
| Model at 100% elongation | — | — | — | — | — | — |
| Model at 200% elongation | — | — | — | — | — | — |
| Model at 300% elongation | 22.0 | 28.0 | 30.0 | 38.0 | 40.0 | 42.0 |
| Elongation % | 620 | 560 | 500 | 480 | 420 | 380 |
| Tearing kg/cm | | | | | | |
| . Angular | 22.0 | 22.0 | 24.0 | 30.5 | 30.0 | 28.0 |
| Remaining elongation % | 35 | 25 | 20 | 20 | 10 | 10 |
| Permanent deformation after compression expressed in: | | | | | | |
| . % of H (1) | 10.5 | 7.5 | 6.40 | 9.80 | 6.50 | 5.9 |
| . % of the deflection (2) | 42.3 | 29.7 | 25.60 | 39.5 | 26.6 | 24.1 |

(1) H = Height of the test piece at the beginning
(2) at 25% deflection

| Reference Mixture | 1 | 2 |
|---|---|---|
| E.P.D.M. Rubber Keltan 514 PO$_3$ | 100.00 | 100.00 |
| Precipitated Silicate (Zeolex 25) | 80.00 | 80.00 |
| Clear naphthenic oil | 40.00 | 40.00 |
| Stearic acid | 4.00 | 4.00 |
| Zinc oxide | 5.00 | 5.00 |
| Polyethylene glycol 4000 | 4.00 | 4.00 |
| Rhodeptax 2 (brand filed Rhone Poulenc) | 3.50 | 3.50 |
| Tetramethylthiuram disulfide | 0.50 | 0.50 |
| Sulfur | 2.50 | 2.50 |
| Polyvinyl alcohol (Rhodoviol 25/100 M) | — | 4.00 |

The mixtures were obtained according to the so-called hot operating method.

The following table gives the results obtained. It shows that the addition of polyvinyl alcohol causes an improvement in the modulus, in the remaining elongation, in the hardness, in the permanent deformation upon compression, and in the resistance to tearing.

EXAMPLE 9

The mixtures were obtained according to the formulae given in the table below:

| Reference Mixture | 1 | 2 | 3 |
|---|---|---|---|
| E.P.D.M. Rubber Keltan 514 PO$_3$ | 100.00 | 100.00 | 100.00 |
| Kaolinic clay | 150.00 | 150.00 | 150.00 |
| Clear naphthenic oil | 40.00 | 40.00 | 40.00 |
| Polyethylene glycol 4000 | 6.00 | 6.00 | 6.00 |
| Polyvinyl alcohol (Rhodoviol 25/140) | 0.00 | 6.00 | 0.00 |
| Stearic acid | 3.00 | 3.00 | 3.00 |
| Zinc oxide | 5.00 | 5.00 | 5.00 |
| Rhodeptax 2 (brand filed Rhone Poulenc) | 2.00 | 2.00 | 2.00 |
| Tetramethylthiuram disulfide | 0.30 | 0.30 | 0.30 |
| Sulfur | 2.00 | 2.00 | 2.00 |

The mixtures were obtained according to the so-called hot operating method for mixtures 1 and 2 and

| Reference of the mixtures | 1 | | | 2 | | | 3 | | |
|---|---|---|---|---|---|---|---|---|---|
| Monsanto Rheometer at 150° C | | | | | | | | | |
| Minimal couple (Cm) | 4.0 | | | 6.5 | | | 5.5 | | |
| Maximal couple (CM) | 49.0 | | | 66.5 | | | 59.0 | | |
| CM - Cm) | 45.0 | | | 60.0 | | | 53.5 | | |
| Vulcanization at 150°C. (minutes) | 8 | 10 | 15 | 8 | 10 | 15 | 8 | 10 | 15 |
| Rupture resistance kg/sq cm | 113 | 125 | 125 | 126 | 117 | 112 | 105 | 116 | 108 |
| Shore Hardness A | 50 | 51 | 52 | 63 | 64 | 67 | 53 | 54 | 55 |
| Model at 100% elongation | 10.0 | 12.0 | 12.0 | 20.0 | 23.0 | 23.0 | 12.0 | 12.0 | 14.0 |
| Model at 200% elongation | 12.0 | 14.0 | 14.0 | 24.0 | 25.0 | 26.0 | 14.0 | 15.0 | 16.0 |
| Model at 300% elongation | 16.0 | 16.0 | 30.0 | 30.0 | 31.0 | 16.0 | 17.0 | 16.0 | 13.0 |
| Elongation % | 840 | 760 | 730 | 650 | 615 | 580 | 695 | 660 | 610 |
| Tearing kg/cm | | | | | | | | | |
| . Angular | 19.0 | 18.5 | 19.5 | 26.5 | 27.0 | 27.0 | 18.5 | 19.5 | 20.5 |
| Remaining elongation % | 65.0 | 64.0 | 60.0 | 65.0 | 64.0 | 60.0 | 62.0 | 60.0 | 58.0 |
| Permanent deformation after compression expressed in: | | | | | | | | | |
| . % of H (1) | 23.4 | 23.2 | 20.9 | 22.2 | 21.85 | 16.50 | 19.5 | 18.1 | 14.8 |
| . % of the deflection (2) | 93.6 | 92.8 | 84.2 | 88.8 | 87.1 | 68.10 | 79.5 | 72.55 | 59.65 |

(1) H = Height of the test piece at the beginning
(2) at 30% deflection the so-called cold operation method for mixture 3.

The following table gives the results obtained. It shows that the presence of polyvinyl alcohol causes a very clear augmentation in the modulus, in the hardness and in the resistance to tearing.

EXAMPLE 9a

The mixtures were obtained according to the formulae given in the table below:

| Reference Mixture | 1 | 2 | 3 |
|---|---|---|---|
| E. P. D. M. Rubber Keltan 514 PO$_3$ | 100.00 | 100.00 | 100.00 |
| Zinc oxide | 5.00 | 5.00 | 5.00 |
| Stearic acid | 2.00 | 2.00 | 2.00 |
| Clear naphthenic oil | 60.00 | 60.00 | 60.00 |
| Thermal silica | 200.00 | 200.00 | 200.00 |
| Polyethylene glycol 4000 | 4.00 | 4.00 | 4.00 |
| Polyvinyl alcohol (1) Rhodoviol 25/140) | 0.00 | 8.00 | 0.00 |
| Rhodeptax 2 (brand filed Rhone Poulenc) | 2.00 | 2.00 | 2.00 |
| Tetramethylthiuram disulfide | 1.00 | 1.00 | 1.00 |
| Sulfur | 1.50 | 1.50 | 1.50 |

The mixtures were obtained according to the so-called hot operating method for mixtures 1 and 2 and the so-called cold operating method for mixture 3.

The following table gives the results obtained. It shows that the presence of polyvinyl alcohol causes an improvement in the remaining elongation, in the hardness, in the modulus, and in the permanent deformation upon compression.

In formula 2 the polyvinyl alcohol was previously made to swell with heat in the diethyleneglycol.

The mixtures were obtained according to the so-called cold operating method.

The following table gives the results obtained. It shows that the addition of polyvinyl alcohol causes an improvement in the modulus and in the permanent deformation after compression.

| Reference of the mixtures | 1 | | | 2 | | | 3 | | |
|---|---|---|---|---|---|---|---|---|---|
| Monsanto Rheometer at 105° C | | | | | | | | | |
| Minimal couple (Cm) | 18.5 | | | 13.50 | | | 22.0 | | |
| Maximal couple (CM) | 71.0 | | | 81.00 | | | 81.00 | | |
| (CM - Cm) | 52.5 | | | 67.50 | | | 59.0 | | |
| Vulcanization at 150° C (Minutes) | 10 | 15 | 20 | 10 | 15 | 20 | 10 | 15 | 20 |
| Rupture resistance kg/sq cm | 93 | 99 | 101 | 68 | 68 | 66 | 118 | 112 | 106 |
| Shore Hardness A | 55 | 56 | 60 | 71 | 72 | 73 | 58 | 59 | 60 |
| Model at 100% elongation | — | — | — | — | — | — | — | — | — |
| Model at 200% elongation | — | — | — | — | — | — | — | — | — |
| Model at 300% elongation | 4 | 4 | 5 | 24 | 18 | 18 | 9 | 9 | 10 |
| Elongation % | 945 | 840 | 810 | 580 | 570 | 575 | 720 | 710 | 710 |
| Tearing kg/cm Angular | 19.5 | 25.3 | 21.0 | 28.4 | 25.5 | 27 | 27.0 | 26.0 | 27.5 |
| Remaining elongation % | 80 | 75 | 75 | 50 | 45 | 45 | 70 | 65 | 65 |
| Permanent deformation after compression expressed in: | | | | | | | | | |
| . % of H (1) | 20.95 | 16.9 | 12.45 | 12.55 | 8.3 | 6.3 | 16.3 | 14.2 | 10.2 |
| . % of the deflection (2) | 83.0 | 66.6 | 48.0 | 49.7 | 33.2 | 24.1 | 64.8 | 56.2 | 40.3 |

(1) H = Height of the test piece at the beginning
(2) at 25% deflection

EXAMPLE 10

The mixtures were obtained according to the formulae shown in the table below:

| Reference mixture | 1 | 2 |
|---|---|---|
| EPDM Rubber Keltan 514 PO$_3$ | 100 | 100 |
| Precipitated silica | 80 | 80 |
| Clear naphthenic oil | 40 | 40 |
| Stearic acid | 2 | 2 |
| Zinc oxide | 5 | 5 |
| Diethylene glycol | 6 | 6 |
| Rhodeptax 2 (brand filed Rhone Poulenc) | 3.5 | 3.5 |
| Tetramethylthiuram disulfide | 0.5 | 0.5 |
| Sulfur | 2.5 | 2.5 |
| Polyvinyl alcohol 4/125 | | 2 |

What is claimed is:

1. An improved elastomeric composition which when vulcanized has improved properties, said composition consisting of a solid elastomer selected from the group consisting of natural rubber, copolymers of butadiene styrene, polybutadiene, butyl rubber, cis-polyisoprene, polychloroprene, ternary polymers of ethylene-propylene-diene monomers, and combinations thereof; a siliceous filler selected from the group consisting of clays, kaolins, precipitated silicates, thermal silicas, precipitated silicoaluminates, precipitated calcium silicates and combinations thereof; said siliceous filler being present in an amount such that the percentage by weight of said siliceous filler with respect to the elastomer is in the range of between 5 and 250%; and as an additive, polyvinyl alcohol, said polyvinyl alcohol comprising between about 0.5 and 20% by weight of the elastomer and from about 0.5 to 10% by weight of the siliceous filler, and said polyvinyl alcohol remaining in a free state to maintain all of its solubility in water.

2. In a process wherein the properties of a solid elas-

| Reference of the mixtures | | | 1 | | | 2 | |
|---|---|---|---|---|---|---|---|
| Polyvinyl alcohol 4/125 by weight with respect to silica | | | | | | 2.5% | |
| Monsanto Rheometer at 150° C | | | | | | | |
| Minimal couple (Cm) | | | 36 | | | 26 | |
| Maximal couple (CM) | | | 84 | | | 89 | |
| (CM - Cm) | | | 48 | | | 63 | |
| Vulcanization at 150° C (minutes) | 10 | 15 | 20 | 10 | 15 | 20 |
| Rupture resistance kg/sq cm | 125 | 123 | 126 | 132 | 130 | 131 |
| Shore Hardness A | 69 | 69 | 70 | 69 | 70 | 70 |
| Model at 100% elongation | 28 | 26 | 26 | 34 | 36 | 36 |
| Model at 200% elongation | 47 | 44 | 45 | 56 | 55 | 53 |
| Model at 300% elongation | 65 | 65 | 66 | 78 | 75 | 77 |
| Elongation % | 520 | 525 | 525 | 505 | 495 | 505 |
| Tearing Kg/cm | | | | | | |
| . Angular | 38 | 38 | 38 | 36 | 36.5 | 37 |
| Remaining elongation % | 52 | 50 | 48 | 43 | 42 | 42 |
| Permanent deformation after compression expressed in: | | | | | | |
| . % of H (1) | 14 | 13 | 11.5 | 13.5 | 10 | 9 |
| . % of the deflection (2) | 68 | 52 | 47 | 53 | 38 | 37 |

(1) H = Height of the test piece at the beginning
(2) at 25% deflection tomer selected from the group consisting of natural rubber, copolymers of butadiene styrene, polybutadiene, butyl rubber, cis-polyisoprene, polychloroprene, ternary polymers of ethylenepropylene-diene monomers, and combinations thereof are improved by the incorporation, prior to vulcanization, of a siliceous filler, the improvement comprising incorporating a siliceous filler with said elastomer prior to vulcanization, said siliceous filler being selected from the group consisting of clays, kaolins, precipitated silicas, thermal silicas, precipitated silicoaluminates, precipitated calcium silicates and combinations thereof, and being added in an amount such that the percentage by weight of said siliceous filler with respect to said elastomer is in the range of between 5 to 250%, said improvement further comprising adding polyvinyl alcohol to the composition consisting of said elastomer and said siliceous filler prior to vulcanization to thereby obtain a mixture having a high level of a siliceous filler and which, when vulcanized, has improved properties including permanent set upon compression and increased hardness, modulus and tear resistance; said polyvinyl alcohol being added to said mixture of said elastomer and filler, prior to vulcanization, in an amount such that its percentage by weight is between 0.5 to 20% by weight of said elastomer and between 0.5 and 10% by weight of said siliceous filler, and said polyvinyl alcohol remaining in a free state to maintain all of its solubility in water.

* * * * *

UNITED STATES PATENT OFFICE
CERTIFICATE OF CORRECTION

PATENT NO. : 3,856,723
DATED : December 24, 1974
INVENTOR(S) : George Vrisakis and Jean Machurat It is certified that error appears in the above-identified patent and that said Letters Patent are hereby corrected as shown below.

Col. 1, line 56, "empolyed" should be -- employed --.

Col. 15-16, table at bottom of page, the data for "Model at 300% elongation" should be as follows:

--

| Vulcanization at 150°C (minutes) | 8 | 10 | 15 | 8 | 10 | 15 | 8 | 10 | 15 |
|---|---|---|---|---|---|---|---|---|---|
| Model at 300% elongation | 13.0 | 16.0 | 16.0 | 30.0 | 30.0 | 31.0 | 16.0 | 17.0 | 16.0 |

--

Signed and Sealed this twenty-second Day of July 1975

[SEAL]

Attest:

RUTH C. MASON
Attesting Officer

C. MARSHALL DANN
Commissioner of Patents and Trademarks